Dec. 7, 1965 H. H. WHITED 3,221,795
TIRE CHANGING MECHANISM
Filed Feb. 20, 1964 2 Sheets-Sheet 1
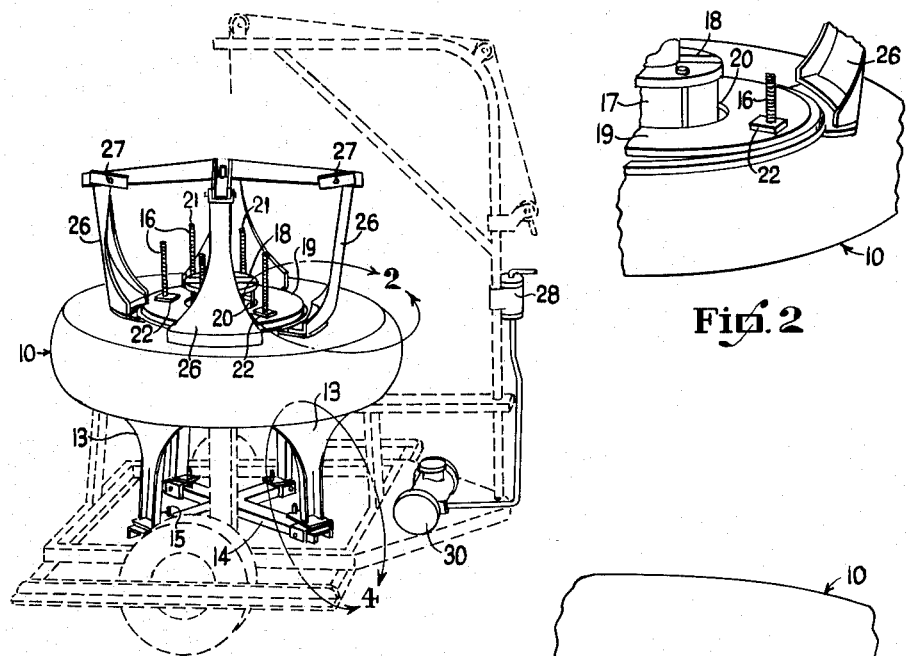
Fig. 1
Fig. 2
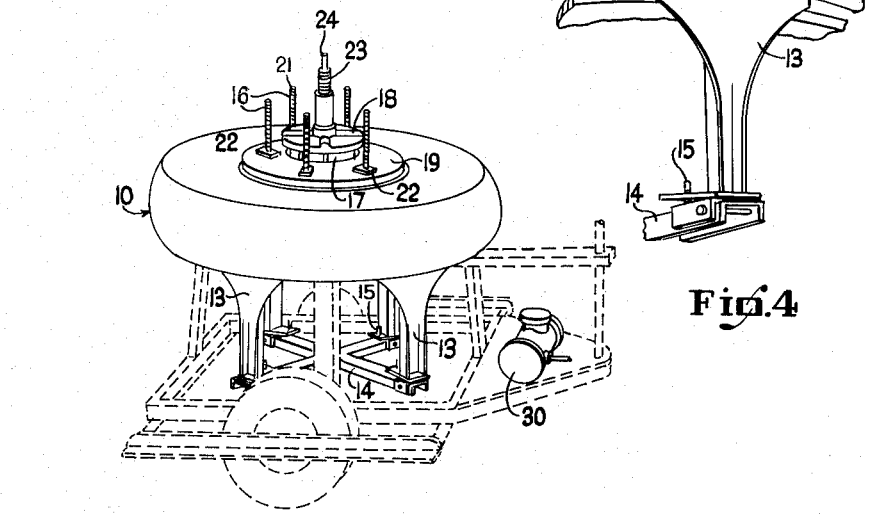
Fig. 3
Fig. 4
INVENTOR
*Harry H. Whited.*

Dec. 7, 1965   H. H. WHITED   3,221,795
TIRE CHANGING MECHANISM
Filed Feb. 20, 1964   2 Sheets-Sheet 2

INVENTOR
*Harry H. Whited.*

United States Patent Office 3,221,795
Patented Dec. 7, 1965

3,221,795
TIRE CHANGING MECHANISM
Harry H. Whited, 1314 Midland Ave., Barberton, Ohio
Filed Feb. 20, 1964, Ser. No. 346,137
3 Claims. (Cl. 157—1.2)

This invention relates in general to the automotive vehicle repair art, since automotive vehicles are by far the largest users of those types of wheels having pneumatic tires that are too large and heavy to change without the necessity of employing the use of mechanism and/or tools that are normally not a part of the equipment found in the average garage.

The one art outside of the automotive vehicle repair industry in which this invention may also relate is that of large aircraft maintenance, where the wheels of the huge transport airplanes are similar to that of automotive busses, tractors, trailers, and large trucks.

As anyone who has ever changed a pneumatic tire on a large wheel well knows, this job is next to impossible to accomplish without considerable time-consuming and exhaustive effort. If the job has to be done on a highway away from a large city, the chances are that the nearest garage will not have any equipment that will make the job easier and reduce the time required, which is usually of extreme importance if a predetermined schedule is to be kept by the bus or truck.

It is, therefore, the principal object of this invention to provide a tire changing mechanism that will absorb a large portion of the manual labor normally required to change the pneumatic tires on large and heavy vehicle wheels, particularly when the tire has been on the wheel for a long time and is stuck to the rim thereof.

Another object of this invention is to provide a tire changing mechanism that can be made portable merely by mounting on wheels and thus making it possible to tow the device behind any automobile to wherever it may be needed.

Another object of this invention is to provide a tire changing mechanism that can be used in connection with the hoist found in any automobile repair shop without making any alterations to the same.

Another object of this invention is to provide a tire changing mechanism that is foolproof in operation and can, therefore, be correctly and successfully used by even the most inexperienced person in the mechanical arts.

Another object of this invention is to provide a tire changing mechanism that has a minimum number of parts and can, therefore, be manufactured and retailed at a price acceptable to nearly any garage owner.

Still another, although not necessarily the last object of this invention, is to provide a tire changing mechanism that will all but eliminate the chance of serious injury by its user, as cannot help but happen when one attempts to change a big and heavy bus or truck tire without proper equipment.

Another object of this invention is to provide a tire changing mechanism that can be produced as a complete mobile tire changing unit having its own hoist, as will be described in this specification.

The more specific objects and advantages will become apparent from a consideration of the description following taken in connection with accompanying drawings illustrating an operative embodiment, and wherein:

FIGURE 1 is a perspective view of this invention with a wheel and tire in place for tire changing. The entire mechanism is mounted on a mobile unit complete with crane, which is shown in dash lines.

FIGURE 2 is a perspective view of that portion of FIGURE 1 that is enclosed within the arrowed ellipse and indicated by the numeral 2 in FIGURE 1.

FIGURE 3 is a view similar to that of FIGURE 1 but with part of the tire changing mechanism removed and the crane not shown.

FIGURE 4 is a perspective view of that portion of FIGURE 1 that is enclosed within the arrowed ellipse and indicated by the numeral 4 in FIGURE 1.

Figure 5:
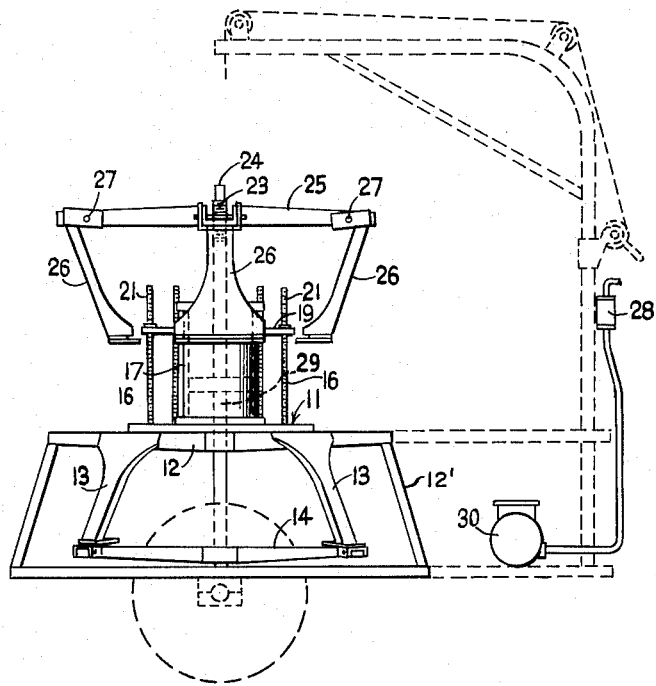
FIGURE 5 is a side view of FIGURE 1, but with the wheel and tire not shown.
Figure 6:
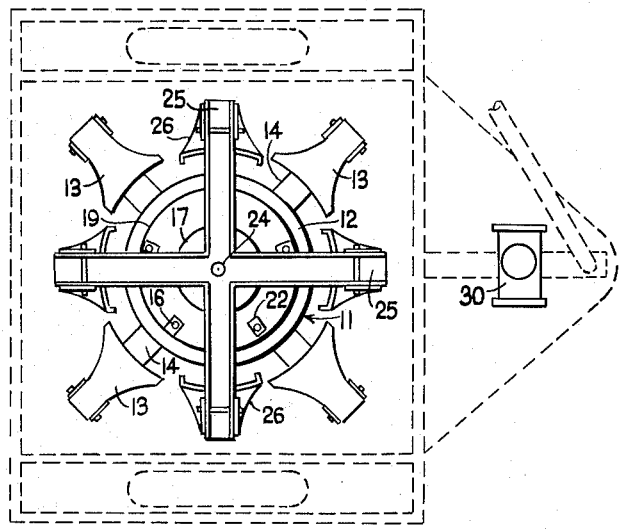
FIGURE 6 is a top view of FIGURE 5, but with only a small portion of the crane being shown.

In the accompanying drawings, the mechanism is shown supporting a tire and rim that is indicated by the reference numeral 10, and which is resting in a horizontal position on top of the frame 11 that embodies a plurality of radially and equally spaced intermediate spider arms 12. The bead breakers 13 have their lower ends slidably mounted on the bottom spider arms 14, to which they are secured by the lock bolts 15. The aforesaid frame 11, and all detail parts secured to it, are supported by the upper end of two or more uprights 12' that have their lower ends fastened to any suitable platform that may or may not be of the wheeled type. The addition of wheels, of course, makes the mechanism mobile, as it can then be either pushed to wherever it may be needed or towed behind any automotive vehicle or the like. The aforesaid uprights and the platform, as well as a crane that will no doubt be secured to the same, are all shown in dash lines and are not noted on the drawings by any reference numerals, since they are not an actual part of this invention and no claims are made for the same.

Looking now at FIGURES 1 and 5 of the drawings, it will be seen that the aforesaid frame 11 is provided with a plurality of radially and equally spaced vertically mounted holddown rods 16 that are located around the centrally mounted hydraulic cylinder 17 that is of the vertical type, and which is provided with a cylinder head 18. A tire and rim is placed on frame 11, over the top of which tire and rim 10 is removably placed a horizontally disposed circular holddown plate 19 having a centrally located circular opening 20 larger than that of the diameter of the aforesaid cylinder 17, over which it is located. The holdhdown plate 19 is provided with a plurality of radially and equally spaced openings adapted to receive the threaded upper ends 21 of the aforesaid holddown rods 16 when this invention is in use, as will hereinafter be described. Nuts 22 secure the aforesaid holddown plate 19 against the rim of the tire and rim 10.

Continuing to look at FIGURES 1 and 5, it will be further seen that the upper and threaded end 23 of the piston rod 24 projects through and is screwed to the top spider arms 25 on the outer ends of which are located the upper bead breakers 26 by means of the removable pins 27.

The way in which this novel invention of a tire changing mechanism works will appear quite clear to anyone having a knowledge of mechanics and/or related subject matter. However, for the benefit of people not having this knowledge, the mechanism is used in the following manner.

The tire and rim 10 to be changed is placed over the hydraulic cylinder 17 with the rim resting on frame 11. Now place the holddown plate 19 over the holddown rods 16 and secure the plate thereon by means of the aforesaid nuts 22 by hand. It is assumed that bead breakers 13 are not in place. Next run the piston rod 24 upward by means of the hydraulic control 28 and then place the top spider arms 25 on the piston rod 24 and secure threaded end 23 to top spider 25 by threaded connection, and then place the aforesaid upper bead breakers 26 on the outer ends of the aforesaid top spider arms 25, to which the breakers are secured by the removable pins 27, as has already been mentioned in that part of this specification that deals with the construction of this invention. Now activate the aforesaid piston rod 24 by the already mentioned hydraulic control 28 and bring the fishtail bead breakers 26 downward, thereby breaking the bead of the tire loose from the rim. The hydraulic control 28 is now reversed, thus upwardly pushing the piston rod 24. Remove the top spider arms 25 and its upper bead breakers 26. Now place the bead breakers 13 in position and push the tire 10 off its rim by again activating the hydraulic cylinder 17 by the aforesaid hydraulic control 28. The operation of this part of the invention is possible by reason of the fact that the aforesaid hydraulic cylinder 17 is equipped with two separate and diametrically opposite piston rods, the upper one of which has already been characterized by the reference numeral 24, and the lower one of which is now characterized by the reference numeral 29. The just mentioned lower piston rod 29 has its lowermost end screwed into the center of the aforesaid bottom spider arms 14. The top spider arms may be used when inflating the tire as a safety device by preventing the tire being overinflated and thus perhaps burst, particularly if the tire happens to be an old one or has a weak place thereon. The hydraulic mechanism that provides the power for the hydraulic cylinder 14 is indicated in the accompanying drawings by the reference numeral 30 and is not herein described in detail, since this portion of the invention is admittedly old and no claims are made for the same.

It is, of course, understood that various modifications may be made in the mechanism above described without in any way departing from the spirit of the invention as defined in the appended claims.

Having thus described the invention, what I claim as new and desire to secure by Letters Patent is:

1. Tire changing mechanism of the character described, comprising a frame on which rests a vertically disposed hydraulic cylinder, a piston in said cylinder having an upper and a lower piston rod connected thereto, each said rod carrying spider arms having bead breakers secured to the outer ends thereof, whereby reciprocating movement of said piston will cause the beads of a wheel carried tire supported between said bead breakers to be broken away from the wheel.

2. Tire changing mechanism of the character described, comprising a hydraulic power unit, a frame on which rests a vertically disposed hydraulic cylinder connected to said power unit, a piston in said cylinder having an upper and a lower piston rod connected thereto, each said rod carrying spider arms having bead breakers secured to the outer ends thereof, whereby reciprocating movement of said piston will cause the beads of a wheel carried tire supported between said bead breakers to be broken away from the wheel, said power unit and tire changing mechanism being mounted on wheeled structure adapted to be pulled by an automobile from one place to another.

3. Tire changing mechanism of the character described, comprising a frame on which rests a vertically disposed hydraulic cylinder, a piston in said cylinder having an upper and a lower piston rod connected thereto, each said rod carrying spider arms having bead breakers secured to the outer ends thereof, whereby reciprocating movement of said piston will cause the beads of a wheel carried tire supported between said bead breakers to be broken away from the wheel, a circular holddown plate having a centrally located opening therein, through which projects the said hydraulic cylinder, the said holddown plate being secured in place by a plurality of vertically mounted holddown rods that project upward from the said frame, and the said tire changing mechanism and the hydraulic power unit that operates the said hydraulic cylinder being mounted on wheeled structure adapted to be pulled by an automobile from one place to another.

References Cited by the Examiner
UNITED STATES PATENTS

| | | | |
|---|---|---|---|
| 2,562,995 | 8/1951 | Watkins | 157—1.2 |
| 2,595,258 | 6/1952 | Hildred | 157—1.2 |
| 2,681,692 | 6/1954 | Weaver | 157—1.2 |

GRANVILLE Y. CUSTER, JR., *Primary Examiner.*